US008904523B2

(12) United States Patent
Gordon (10) Patent No.: US 8,904,523 B2
(45) Date of Patent: *Dec. 2, 2014

(54) SECURITY MODULE HAVING A SECONDARY AGENT IN COORDINATION WITH A HOST AGENT

(75) Inventor: William Doyle Gordon, Vancouver (CA)

(73) Assignee: Absolute Software Corporation, Vancouver, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,880

(22) Filed: Oct. 13, 2010

(65) Prior Publication Data

US 2011/0258247 A1 Oct. 20, 2011

Related U.S. Application Data

(63) Continuation of application No. 12/009,317, filed on Jan. 16, 2008, now Pat. No. 7,818,803.

(60) Provisional application No. 60/880,800, filed on Jan. 16, 2007.

(51) Int. Cl.
*H04L 29/06* (2006.01)
*G06F 21/55* (2013.01)
(Continued)

(52) U.S. Cl.
CPC ............. *G08B 13/1418* (2013.01); *H04W 4/02* (2013.01); *G06F 21/554* (2013.01); *G06F*
(Continued)

(58) Field of Classification Search
CPC ....... G06F 21/552; G06F 21/71; G06F 21/88; H04W 12/12
USPC .................... 726/21–25; 709/217; 340/426.2; 380/247
See application file for complete search history.

(56) References Cited

U.S. PATENT DOCUMENTS 5,588,042 A * 12/1996 Comer .......................... 455/413
5,748,084 A 5/1998 Isikoff
(Continued)

FOREIGN PATENT DOCUMENTS

JP 9-244740 9/1997
JP 2005-242590 9/2005
(Continued)

OTHER PUBLICATIONS

Kanter, T.G., "Attaching context-aware services to moving locations," Internet Computing, IEEE , vol. 7, No. 2, pp. 43,51, Mar.-Apr. 2003.*

(Continued)

*Primary Examiner* — Bradley Holder
*Assistant Examiner* — Kari Schmidt
(74) *Attorney, Agent, or Firm* — Liu & Liu (57) ABSTRACT

The invention is directed to a security module deployed in a host device, which provides a secondary agent that operates in coordination with the host agent in the host device, but operates independent of the host operating system of the host device to independently access an existing communication network interface in the host device or a separate dedicated network interface, if available. In one aspect, the present invention enables robust theft recovery and asset tracking services. The system comprises a monitoring center; one or more monitored devices; a security module in the monitored devices; and one or more active communications networks. Monitored devices may be stand alone devices, such as computers (e.g., portable or desktop computers), or a device or a subsystem included in a system. A monitored device comprises a security module, a host agent and software to support the host agent that runs in the monitored device's OS.

21 Claims, 5 Drawing Sheets

(51) Int. Cl.
*G06F 21/57* (2013.01)
*G06F 21/88* (2013.01)
*H04W 12/12* (2009.01)
*G06F 21/81* (2013.01)
*G08B 13/14* (2006.01)
*G06F 21/71* (2013.01)
*H04W 4/02* (2009.01)

(52) U.S. Cl.
CPC ............... 21/575 (2013.01); *G06F 2221/2103* (2013.01); *G06F 2221/2151* (2013.01); *G06F 21/88* (2013.01); *G06F 2221/2153* (2013.01); *H04W 12/12* (2013.01); *G06F 2221/2111* (2013.01); *G06F 21/81* (2013.01); *G06F 21/71* (2013.01); *G06F 2221/2115* (2013.01); *G06F 2221/2141* (2013.01); *G06F 21/552* (2013.01)
USPC ................ 726/22; 726/21; 726/23; 726/24; 726/25; 380/247; 709/217; 709/222; 340/426.2

(56) References Cited

U.S. PATENT DOCUMENTS

| | | | | |
|---|---|---|---|---|
| 6,244,758 | B1* | 6/2001 | Solymar et al. | 709/224 |
| 6,246,666 | B1* | 6/2001 | Purcell et al. | 370/221 |
| 6,269,392 | B1* | 7/2001 | Cotichini et al. | 709/200 |
| 6,300,863 | B1* | 10/2001 | Cotichini et al. | 340/5.8 |
| 6,507,914 | B1* | 1/2003 | Cain et al. | 726/35 |
| 6,950,946 | B1* | 9/2005 | Droz et al. | 726/35 |
| 7,181,195 | B2* | 2/2007 | Booth et al. | 455/411 |
| 7,355,506 | B2* | 4/2008 | Chandley | 340/5.31 |
| 7,530,103 | B2 | 5/2009 | Willman et al. | |
| 7,590,837 | B2* | 9/2009 | Bhansali et al. | 713/2 |
| 7,650,395 | B2* | 1/2010 | Johnson et al. | 709/220 |
| 7,818,803 | B2* | 10/2010 | Gordon | 726/22 |
| 8,079,073 | B2* | 12/2011 | Roberts | 726/11 |
| 2002/0112052 | A1* | 8/2002 | Brittingham et al. | 709/224 |
| 2002/0161934 | A1 | 10/2002 | Johnson et al. | |
| 2005/0190699 | A1 | 9/2005 | Smith et al. | |
| 2005/0213603 | A1* | 9/2005 | Karighattam et al. | 370/463 |
| 2006/0080672 | A1* | 4/2006 | Smith et al. | 719/317 |
| 2006/0132307 | A1* | 6/2006 | Velhal et al. | 340/568.1 |
| 2006/0272020 | A1 | 11/2006 | Gardner | |
| 2008/0148364 | A1* | 6/2008 | Hopen et al. | 726/4 |

FOREIGN PATENT DOCUMENTS

| | | |
|---|---|---|
| WO | 2004/066085 | 8/2004 |
| WO | 2006/028535 | 3/2006 |
| WO | 2006/031262 | 3/2006 |
| WO | 2007/004754 | 1/2007 |

OTHER PUBLICATIONS

Ruimin Liu; Feng Chen; Yang, H.; Chu, W.C.; Yu-Bin Lai, "Agent-based Web services evolution for pervasive computing," Software Engineering Conference, 2004. 11th Asia-Pacific , vol., No., pp. 726,731, Nov. 30-Dec. 3, 2004.*

Webpage, http://inside.cybernet.ch/redaktion/vPro_Whitepaper.pdf, entitled "Built-in Manageability and Improved Security for Desktop PCs", 2006, pp. 1-16.

* cited by examiner

SECURITY MODULE HAVING A SECONDARY AGENT IN COORDINATION WITH A HOST AGENT

This is a Continuation of U.S. patent application Ser. No. 12/009,317, filed on Jan. 16, 2008 now U.S. Pat. No. 7,818,803, which application claims the priority of U.S. Provisional Application No. 60/880,800, filed Jan. 16, 2007. These documents and other publications referenced herein are fully incorporated by reference as if fully set forth herein.

BACKGROUND OF THE INVENTION

1. Field of the Invention

The present invention relates to a security module for devices (e.g., electronic devices), particularly a security module for communicating with an external site for remote monitoring of the devices for purposes such as tracking assets and assisting in the recovery of stolen or lost assets, and more particularly a wireless security module for such purposes. Such devices may include, without limitations, processor controlled devices such as computers, and systems which include processor based devices, such as photocopiers.

2. Description of Related Art

U.S. Pat. No. 4,818,998 assigned to Lo-Jack Corporation describes a method for the theft recovery of automobiles in which police tracking vehicles home-in on periodic transponder radio transmissions automatically activated by command activation signals broadcast on the same carrier frequency with encoded vehicle identification information that causes the intended vehicle transponder to reply.

GM's OnStar technology provides a generic wireless platform for delivering services to a mobile system. In the case of OnStar, the mobile system is an automobile, not a user portable device such as a laptop. OnStar can be used for theft recovery and may be used to deliver other services as well. With OnStar, a device contacts a remote station upon a user initiated event.

U.S. Pat. No. 5,748,084, relates to an object tracking, communication, and management system for a laptop computer or similar device, wherein a beacon or transceiver in the computer implements file integrity or device recovery steps such as transmitting, destroying or encoding sensitive data, and emitting a trackable RF signal. A combination of hardware and software within the beacon and the host system initiates and coordinates the operation of communications or security features. For example, communication may be initiated by failure to enter a correct password, a tampering event or by a broadcast signal to the device. Under normal circumstances the beacon implements a standard communication function for the device, such as email, voice or fax. Tamper detection logic is implemented in software or hardware. An incoming data call preferably contains low-level beacon control commands which are interpreted by the beacon prior to the alerting or passing of the data to the computer. Preferably low level codes operate at the BIOS level for performing emergency functions when higher level software or plug-in components have been overridden or removed.

U.S. Pat. No. 6,362,736 provides a system for automatically locating a personal electronic object. The system comprises at least two wireless communicators. When security of the system is compromised, as determined by a tamper sensor or by a user becoming aware of its theft, and access to a computer network or a wireless network is available, the location as determined by a GPS device is transmitted through a communicator.

U.S. Pat. No. 6,636,175 discloses an invention which allows a user to locate a remote paging device located on a person or piece of property to determine its physical position. The position of the remote device is determined by a GPS transceiver and is sent to a position service provider. The position of the remote device is then displayed on a map for the user. In one embodiment a Bluetooth communications network is used, for example in an amusement park or a shopping mall where Bluetooth hubs can be set up at regular intervals.

U.S. Pat. No. 6,950,946 describes a method for discovering and optionally recovering stolen or lost network-attachable computer systems. A network-attachable computer system generates identity information which comprises a secure identifier ID which is protected using an encryption key. This identity information is automatically sent via a network interface to a server module, where it is used to determine whether the respective computer system is reported lost or stolen. The scheme is preferably implemented in hardware, because alternately an operating system (OS) or software implementation can be modified to deactivate the scheme.

US Patent Application Publication No. 2003/0117316 discloses systems and methods for locating and tracking a wireless device, comprising a remote database for storing location information for the wireless device. The systems and methods may include and work in conjunction with a safety mode of the wireless device, which directs the wireless device to enter a low power-use mode, a sleep mode, or a shut-down mode during periods of device inactivity. An electronic wake-up call or a password are preferably required to inactivate or cancel the safety mode.

US Patent Application Publication No. 2006/0123307 discloses a computing platform security apparatus, systems, and methods. Apparatus and systems, as well as methods and articles, may operate to receive status from an OS-independent module capable of providing OS-independent geolocation information associated with a device to a network at some time before executing an operating system. The OS-independent module may be attached to, co-located with, or separated from the device.

The foregoing referenced systems share at least a common drawback, namely the inability to communicate externally should the existing communication interface becomes unavailable or non-functional.

Absolute Software Corporation, the assignee of the present invention, has developed and is marketing Computrace, a product and service that securely tracks assets and recovers lost and stolen assets, and AbsoluteTrack, a secure asset tracking, and inventory management, solution powered by the Computrace technology platform. Computrace deploys a stealth agent, which is a software client that resides on the hard drive of host computers. Once installed, the agent automatically contacts a monitoring center on a regular basis transmitting location information and all auto-discovered asset data points. Ongoing communication between the agent and the monitoring center requires no user intervention and is maintained via an Internet or phone connection. As long as the computer is turned on and has either a connection to a telephone line or access to the Internet (through an ISP or through a company network), the Computrace agent will be able to report asset data to the monitoring center. The user intervention-free communication between the agent and a monitoring center ensures the authorized user of the agent to have secure access to up-to-date location information and comprehensive asset data about their entire computer inventory. Whether used stand-alone, or as a complement to an existing asset management tool, AbsoluteTrack has been a cost-effective application service for helping businesses of all sizes monitor remote, mobile and desktop computers and perform daily hardware and software inventory tracking functions. Computrace has been an effective tool to track theft of mobile computers, and to recovery of stolen mobile computers.

The technology underlying various Computrace products and services have been disclosed and patented in the U.S. and other countries, which patents had been commonly assigned to Absolute Software Corporations. See, for example, U.S. Pat. Nos. 5,715,174; 5,764,892; 5,802,280; 6,244,758; 6,269,392; 6,300,863; and 6,507,914; and related foreign patents. Further information concerning AbsoluteTrack has been published by Absolute Software Corporation (e.g., AbsoluteTrack—Secure Computer Asset Tracking Solution, a white paper, published Apr. 25, 2003).

The modes of communication available to the agent directly impact the ability to track the computer. While the Computrace agent is currently able to communicate via an ethernet, Wi-Fi, other internet or phone connections, it would be desirable to develop an apparatus which would permit the agent to communicate should these existing connections be unavailable or become unavailable, for example due to not using or connecting the computer for an extended period of time. It would be desirable to initiate communications in real time as opposed to a scheduled call. It would also be desirable to communicate if the Computrace agent is unable to do so due to absence of a host OS, presence of an unsupported OS, presence of a firewall or the host system not being powered. It would be desirable to report on attributes of the OS even if the OS is not running. It would also be desirable to have the ability to wake-up the host system and carry out data protection measures or other servicing operations. One or more of these desirable features are provided by the theft recovery and asset tracking system described below.

SUMMARY OF THE INVENTION

The invention is directed to a security module deployed in a host device (e.g., an electronic device), which provides a secondary agent that operates in coordination with the host agent in the host device, but operates independently of the host operating system of the host device to independently access existing communication network interface in the host device or a separate dedicated network interface, if available. The security module may be deployed in conjunction with services that may include asset tracking, asset management, asset recovery, data delete, software deployment, etc.

In one aspect, the present invention enables robust theft recovery and asset tracking services. The system comprises a monitoring center; one or more monitored devices; a security module in the monitored devices; one or more active communications networks; a subscription, if needed, for at least one communications network. Monitored devices may be stand alone devices, such as computers (e.g., portable or desktop computers), or a device or a subsystem included in a system. A monitored device comprises a security module, a host agent and software to support the host agent that runs in the monitored device's OS.

In one embodiment, the security module comprises one or more network interfaces or shared access to the host's interfaces; an application processor that interfaces with the network; persistent storage from which the operating environment or system of the security module or subsystem and applications that run on the application processor are loaded; a secondary, firmware agent that runs in the operating environment or system running on the application processor; persistent storage for use by the firmware agent; zero or more location determination technologies such as GPS. The security module may have a network interface which is dedicated to security-related communications. One or more of the network interfaces may be a WWAN interface. The security module comprises optional interface hardware and software permitting the security module to cause the booting or resuming of the host OS. The security module may or may not have its own power supply.

The security module or subsystem may or may not provide the functions of a normal cellular data modem, including (1) permitting the monitored computer to establish an IP connection, and (2) in the case of a security module with a cellular data interface module, permitting the monitored computer to send and receive SMS messages.

Preferably, the presence and operation of the security module is stealthy or unobvious to the user of the computer. In the case where the security module does not have its own power supply, the system as a whole may or may not be designed to provide independent power to the security module.

If required, a data subscription is established for the networks available to the security module or subsystem. Alternatively, the service is provisioned just-in-time through interfaces between the monitoring center and communications network.

The security module in accordance with the present invention enables robust theft recovery and asset tracking services, with certain behavioral aspects, one or more of which may be incorporated in various embodiments of the system. For example, the host agent calls the monitoring center on a predetermined schedule or upon an interesting change in the attributes of the monitored computer, for example a change in its IP address, and it prefers calling the monitoring center on established network connections. The host agent uses network connections that typically have zero or low cost, including IP connections over Ethernet or WiFi networks. The host agent and firmware agent interface so that, if the host agent is calling normally, only the host agent calls. In this respect, the firmware agent is like a fail-safe or "backup" communications system.

The host agent and/or host agent support software transfers attributes of the monitored computer and OS that would be typically unavailable to an embedded module, including the computer's serial numbers, the host operating system's type, the applications installed in the host operating system, etc. This transfer may happen periodically or as a result of a change in one or more of the attributes.

If the host agent does not call for any reason, or is disabled, the firmware agent will call. Because of the transfer of attributes from the host agent to the security module, the firmware agent is able to report to the monitoring center the same attributes that the host agent reports permitting the computer to be identified and the attributes to be uploaded to the monitoring center.

Separate from its regular call capability, the host agent is able to send and receive messages to and from the monitoring center. Messages from the monitoring center may, for example, indicate that the host agent should call the monitoring center to invoke a data protection measure. These messages may be over SMS.

Separate from its regular call capability, the firmware agent is also able to independently send and receive messages to and from the monitoring center. Messages from the monitoring center may, for example, indicate that the firmware agent should wake-up the host so that a data protection measure can be invoked.

If a location determination technology is available on the security module or another subsystem, then the host agent and/or firmware agent may report this position to the monitoring center.

If the host OS is re-installed, the security module is detected via plug-and-play or other hardware detection and driver selection process, and the driver, agent and support software for the security module can be re-installed from Windows or other OS installation media and via on-line sources for drivers such as Windows Update.

In accordance with another embodiment of the present invention, an asset to be protected, for example an electronic device such as a laptop computer, comprises an agent that executes from the laptop's OS and additionally a wireless security module that can transmit and receive, and which may be similar to a regular embedded cellular wireless module. The wireless module comprises firmware which can instruct the module to call a monitoring center independently of the host agent. The firmware may make the call on a regular cellular subscriber channel or on a dedicated security channel.

The monitoring center is able to initiate a request for a subscription for a dormant communications channel. The advantage of this feature is that a user does not have to maintain a cellular communications subscription if it is not required for that user's normal usage of the laptop. In the event of a theft, the user can inform the monitoring center of the theft so that just-in-time provisioning of a wireless communications channel can be made in order for recovery or data protection steps to be taken.

The principal commercial uses of the disclosed technology may include theft recovery of stolen computers and asset tracking management of computers. Since the fundamental characteristics of the technology are to be persistent and difficult to accidentally remove, even by authorized users, and to have a reliable communications pipe, which is dormant and can be brought to life, or is repairable, the technology can be used for many purposes, including guaranteeing the installation of applications of any type. The applications that most benefit from such features are system management applications.

An advantage of the system when implemented in a host system such as a laptop with a cellular radio interface is that it may connect to a monitoring center at any time and place where there is network coverage. It does not have to wait for a wired or WiFi Internet connection to be established. In the case of an independently-powered module, this advantage is even clearer as communications can be made without having to wait until the laptop is powered on. Communications with the laptop can be made even if there is no OS or an unsupported OS is installed on the host system. It can withstand attacks on the integrity of the host agent. It can circumvent firewalls that might block the host agent.

In accordance with a further embodiment of the present invention, the security module may support a wireless communications channel dedicated to security purposes only, allowing data and air charges to be billed to a theft-recovery service provider. This permits communications even if the subscriber has not acquired personal wireless service or if the subscriber's personal service is terminated for whatever reason, including theft of the system. Availability of both a dedicated security channel and a subscriber channel permits the development of logic to select an appropriate communications channel based on cost optimization for both the subscriber and the security monitoring provider. For example, the subscriber's channel could be used and the subscriber billed until that channel is unavailable for whatever reason.

The theft recovery and asset tracking system may include or interact with one or more of the various components, features and services which have been disclosed and patented in the U.S. and other countries and commonly assigned to Absolute Software Corporation. See, for example, U.S. Pat. Nos. 5,715,174; 5,764,892; 5,802,280; 6,244,758; 6,269,392; 6,300,863; and 6,507,914, which are hereby fully incorporated by reference as if fully set forth herein.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims. The present invention can find utility in a variety of implementations without departing from the scope and spirit of the invention, as will be apparent from an understanding of the principles that underlie the invention. For purpose of illustrating the features and functions of the security module of the present invention, reference is made to asset tracking and recovery as one example of the services in conjunction with which the present invention may be deployed. It is understood that the security module of the present invention may be used for other services, such as computer management, backup and recovery applications, remote data deletion operations, etc., without departing from the scope and spirit of the present invention.

The detailed descriptions that follow are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

Overview of Security Module and Deployment

The inventive security module can be deployed in a host device (e.g., an electronic device), which provides a secondary agent that operates in coordination with the host agent in the host device, but operates independent of the host OS of the host device to independently access existing communication network interface in the host device or a separate dedicated network interface, if available. The overall system comprises a monitoring center; one or more monitored host devices; a security module in the monitored host devices; one or more communications networks; a subscription for at least one communications network. Monitored host devices may be stand alone devices, such as computers (e.g., portable or desktop computers), or a device or a subsystem included in a system. A monitored device comprises a security module, a host agent and software to support the host agent that runs in the monitored device's OS.

The security module of the present invention may be deployed as a component, or subsystem, that complements existing asset tracking applications. For example, the security module may be deployed as a component of the AbsoluteTrack and/or Computrace developed by Absolute Software Corporation, the assignee of the present invention. Computrace is a product and service that securely tracks assets and recovers lost and stolen assets, and AbsoluteTrack, a secure asset tracking, and asset management, asset recovery, data delete, software deployment, etc. solutions powered by the Computrace technology platform. Computrace deploys a stealth agent, which is a software client that resides on the hard drive of client computers. Absolute Software Corporation further improved on the original agent platform by providing an improved tamper resistant servicing Agent for enabling, supporting and/or providing various services relating to management and protection of assets (including without limitation hardware, firmware, software, data, etc.), including services such as data delete, firewall protection, data encryption, location tracking, message notification, and software deployment and updates. The servicing functions can be controlled by a remote server. The technology underlying various Computrace products and services have been disclosed and patented in the U.S. and other countries, which patents had been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of persistent agent and various related services are disclosed in co-pending U.S. patent application Ser. No. 11/093,180, filed Mar. 28, 2005 (now published U.S. Patent Publication No. US2005-0216757; which corresponds to PCT Application Publication No. WO 2006/102399); U.S. patent application Ser. No. 11/386,040, filed Mar. 20, 2006 (now published U.S. Patent Publication No. US2006-0272020), and U.S. patent application Ser. No. 11/726,352, filed Mar. 20, 2007 (now U.S. Patent Application Publication No. US2007-0234427 A1; which corresponds to PCT Application Publication No. WO 2007/109366).

Further information concerning AbsoluteTrack has been published by Absolute Software Corporation (e.g., AbsoluteTrack—Secure Computer Asset Tracking Solution, a white paper, published Apr. 25, 2003). These documents are fully incorporated by reference as if fully set forth herein.

Theft Recovery and Asset Tracking System Overview

Asset tracking and theft recovery is an example of the services that can be enabled with, supported by and/or provided with the device identification application of the present invention. The device or asset to be protected by the theft recovery and asset tracking system disclosed herein is referred to as a host. The host may be a laptop computer, a cellphone, a Blackberry, a portable electronic gaming console, a personal digital assistant, an audio or visual entertainment device, medical equipment, any system or device which includes a computer, any other electronic device or a dedicated electronic tracker for securing electronic or non-electronic assets such as motor vehicles, boats, and goods in transit.

Figure 5:
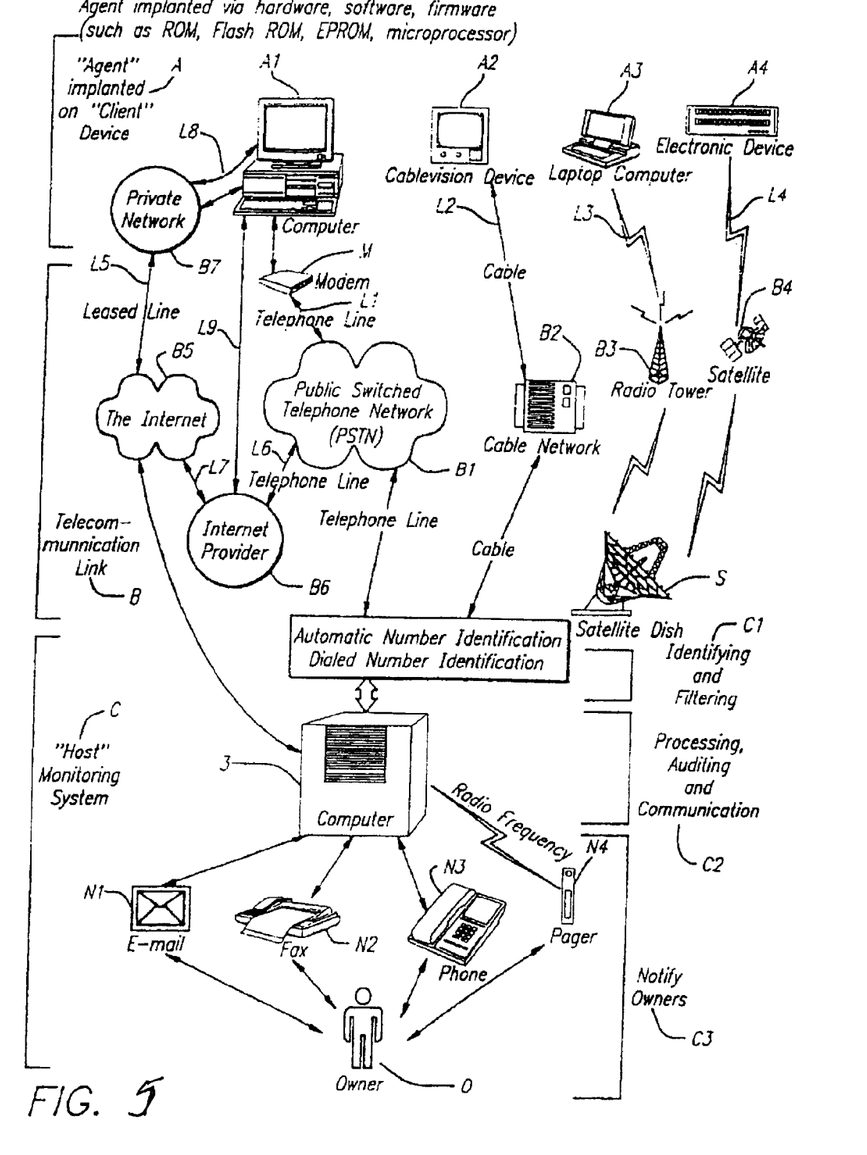
FIG. 5 is a schematic diagram depicting representative communication links including networks by which the inventive security module may be implemented in accordance with one embodiment of the present invention.

Referring to FIG. 5, the asset tracking system in accordance with one embodiment of the present invention involves a client/server architecture, which may comprise the following main components: (a) host device A consisting of, for example, any one of the electronic devices shown which have been implanted with an optional persistent host agent and a security module in accordance with the present invention. The host agent and the secondary agent in the security module run in a coordinated manner on the host devices A for the purpose of reporting deploying applications including, for example, reporting information to and receiving instructions from a remote server to program the host agent to support and execute a desired function. (b) a communication link B, such as an information exchange network, which may include switched communications networks, the Internet, private and public intranet, radio networks, satellite networks, and cable networks; and (c) a host monitoring system C, which include a host monitoring server 3 that monitors the communications between the host device A and the host monitoring system C, which is contacted on a regular or scheduled basis by the host devices records information from the host devices. The monitoring server also provides instructions to the host on what actions to perform, including what actions the host is to perform, what data to collect and the hosts next scheduled call time.

In accordance with the present invention, the host monitoring system C is configured to communicate with the host agent in the host device A and the secondary agent in the security module in the host device A, which remotely determines the identity of the host devices being monitored (e.g., by evaluating the data points collected using the device attribute collection application residing in the host devices, as disclosed in U.S. patent application Ser. No. 11/726,352, filed Mar. 20, 2007 (now U.S. Patent Application Publication No. US2007-0234427 A1; which corresponds to PCT Application Publication No. WO 2007/109366). The host devices A contact the monitoring server via the communication link B. The host monitoring system C may include a reporting and administration portal, which provides customers, administrators and asset tracking service providers the ability to view data and manage the functions of the monitoring server and the host devices.

With the exception of the inventive security module and the integration of such in the host devices, each of the components shown in FIG. 5 has been fully disclosed in the copending U.S. patent application Ser. No. 11/386,040, filed Mar. 20, 2006 (now U.S. Patent Application Publication No. US2006-0272020; which corresponds to PCT Application Publication No. WO 2006/102399).

Host devices A that are implemented with the inventive security module in accordance with the present invention include may be selectively operated, activated or configured by a program, application, routine and/or a sequence of instructions and/or logic stored in the devices, in addition to the base host operating systems resident in the devices. In short, use of the methods described and suggested herein is not limited to a particular processing configuration. By way of example and not limitation, the present invention is described in reference to examples of deployments and implementations in reference to a laptop or notebook computer as the host device A (computer A1 is schematically represented as a desktop device, but may instead comprise a portable computing device).

Communication links B includes any form of information exchange networks in which the present invention may be deployed for asset tracking. The information exchange network accessed by the host device, including the security module in accordance with the present invention may involve, without limitation, distributed information exchange networks, such as public and private computer networks (e.g., Internet, Intranet, WWAN, WAN, LAN, etc.), value-added networks, communications networks (e.g., wired or wireless networks), broadcast networks, cable networks, cellular network, radio networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware, firmware and software is not always sharp, it being understood by those skilled in the art that such networks and communications facility, and the components of the persistent agent technology platform, involve software, firmware and hardware aspects.

Asset Tracking and Theft Recovery Employing Security Module

The various parts of the theft recovery and asset tracking system that employs a security module (and in particular a wireless security module), devices comprising the security module and modes of operation will now be described in more detail. As a descriptive example, a laptop computer is used as the device to be protected and in the present application is defined to be the host to the wireless security module and the various software and firmware agents included in the security system. Parts of the system include a host, the security module, a persistent host agent, a firmware agent; supporting software; and a monitoring center.

Support software, in the form of computer readable instructions in or on a computer readable medium, is stored in the host. The support software comprises a driver and an application programming interface (API) layer to interface the wireless module with the host. Both the driver and API are based on the standard driver for a cellular wireless module, but extended in the following ways. The API is extended to support the additional APIs required to interface with the firmware agent. The API is extended to support access to the attribute storage on the security module. The API is extended to permit only trusted applications to invoke sensitive functions of the security module, including each of the above API extensions. If the security module supports use of a dedicated (OTA) security communications channel, the API and driver are extended to allow trusted applications to create, manage and use the dedicated security communications channel.

Interactions Among Components

Three main components interact to facilitate the asset tracking and theft recovery functions, including a security module, a primary host agent and a monitoring center.

A. Security Module or Subsystem

The general attributes of the security module or subsystem are a secondary agent, in the form of a firmware agent, for example, or in other form, loaded from persistent application storage, a network interface and data storage for the firmware agent to read from and write to. The secondary agent is enabled with specific functions, dedicated to coordinating with the host agent to communicate externally, and related functions further described herein. The firmware agent in the security module or security subsystem may run on the application processor of a cellular wireless module, but it may instead reside elsewhere in the monitored computer. Other suitable locations include a separate processor on the motherboard or on a board separate from the motherboard. The firmware agent has access to persistent data storage to which it may read and write.

The firmware, whether located in the wireless module or elsewhere, may or may not be extended to support a dedicated OTA security communications channel. The firmware includes a firmware agent, which can trigger a wireless call to a monitoring center independently of a host agent implemented in the OS. Using the stored attributes in the persistent data storage to which it has access, the firmware agent can act as a surrogate of the host agent.

The host interface firmware supports mechanisms to configure and use the security communications channel; interface with and control the firmware security agent; and store attributes of the host computer on the security module. In each case, these mechanisms are themselves protected with security measures to ensure that the security communications channel can only be used by authorized applications.

The security module comprises one or more network interfaces or shared access to the host's interfaces. The security module may have a network interface which is dedicated to security-related communications. One or more of the network interfaces may be a WWAN interface.

The security module comprises optional interface hardware and software permitting the security module to cause the booting or resuming of the host OS.

In accordance with the present invention, there are a number of different physical forms the wireless security module can take, as follows:

(i) Wireless Wide Area Network (WWAN) Data Module: This module is a hardware module that can be incorporated into hosts such as highly portable computers. It implements functions similar to a regular embedded cellular wireless module. In fact, unless the security features of the present invention are enabled, the module operates uniquely like a regular embedded cellular wireless module.

The wireless security module may support one or two independently billable communications channels. One way of achieving two independently billable channels is for the module to behave like two independent cellular devices with separate equipment identifiers. To switch between channels, the module deregisters from the current network to which it is subscribed and then subsequently reregisters on the network, or a different network, with a different equipment ID. Alternatively, the module may simply support two entirely separate base-bands, each reporting different equipment identifiers. Alternatively, a completely different mechanism may be used to permit independent billing of the communications. In another alternative, the module may be configured or be configurable to support future OTA protocols that permit one cellular wireless module with one equipment identifier to support multiple, independently billed data channels.

Various laptops are available from the OEMs include cellular modems (aka mobile broadband modules, etc.). E.g. www.dell.com, www.hp.com, www.lenovo.com, etc. These modules usually have two processors (most commonly now on the same die). (See, also, Broadcom Corporation published Product Brief *EDGE/GPRS/GSM Single-Chip Multimedia Baseband Processor*; Publication No. BCM2133-PB07-D1; Nov. 30, 2006; http://www.broadcom.com/collateral/pb/2133-PB07-R.pdf). The firmware agent would typically run on the "application processor" on the module.

(ii) WWAN Subsystem

This has the same functionality as (i), except that the hardware chip or chips are located on a motherboard rather than in a module.

(iii) Security Subsystem

In this case the functionality of the security module or subsystem is incorporated in a processor, which is separate from the main processor of the laptop. For example, it may be incorporated in a separate processor that can inject and filter packets into and out of the host's network controller. An example of a such an embodiment could comprise the secondary agent running as a service in the Management Engine firmware framework within the Intel AMT architecture: (See, *Architecture Guide: Intel Active Management Technology*, published Sep. 19, 2007. http://softwarecommunity.intel.com/articles/eng/1032.htm.) In AMT, the second processor runs on auxiliary power.

(iv) Virtualization Implementation

In this case the functionality of the security module or subsystem runs in a virtual environment on the main processor of the computer. The host OS runs as normal and is completely unaware of the security environment and firmware agent. (For further information concerning virtualization, see *An overview of Virtualization: Introduction to Virtualization—Overview of Virtualization and the Most Common Types of Virtualization*; http://www.virtualization.org/Virtualization/Introduction_to_Virtuaization.html). The "firmware agent" could run as part of the hypervisor or in a completely separate OS instance.

B. Host Agent

In accordance with one embodiment, the host agent is a tamper-resistant client module embodied in inside the host. In the present application it refers to an agent that runs from the host OS. The host OS supports running of user applications for the device, e.g., a computer running Microsoft OS, a cell phone running Symbian OS, etc. In prior art the host agent or components of it may be referred to an agent, an intelligent agent, a transparent agent, a segmented agent, a persistent agent, a servicing agent, a tamper resistant servicing agent, an application agent, a tracking agent, a stealth agent, an extensible agent, a calling agent, a full function driver agent, a partial driver agent, a Computrace agent or other similar terms.

The host agent calls the monitoring center periodically or when an interesting change occurs on the monitored computer. During the call it may report on the attributes of the monitored computer, and may include attributes to establish a cellular data connection, if necessary.

The host agent detects the presence of the security module or subsystem, installs the required interfacing and support software and interfaces with and controls it. This includes synchronizing calling behaviour so that normally only the host agent calls the monitoring center and the firmware agent does not. But, it may be desirable to permit the firmware agent to call the monitoring center on occasion to verify correct operation of the system. It also includes transferring attributes to the host agent.

If the security module includes a cellular interface, the host agent can send and receive SMS messages using this interface. The monitoring center can ask the host agent to bring up a cellular data connection via an SMS message.

The host agent also provides sufficient information to a monitoring center in order for the monitoring center to activate a subscription to a security communications channel, if and when such a channel becomes necessary. This includes, for example, providing the unique equipment identifier of the wireless module.

In another embodiment of the present invention, the agent uses the security communication channel only if necessary, for reporting location of the host, or for carrying out urgent or important servicing tasks. In one mode, the security communication channel is only employed if a subscriber channel is unavailable for whatever reason, such that service and overhead expenses incurred by a monitoring center are kept to a minimum. In one embodiment the agent is configured to establish a cellular data connection under special circumstances, for example if attempts to connect via the internet have been unsuccessful for more than a predetermined time period. Other operational modes can also be envisioned.

In one embodiment, the agent supports calls initiated by a monitoring center rather than having the monitoring center wait for a scheduled call from the host. The monitoring center may initiate a data call to allow the agent to communicate over a cellular network rather than via the internet. In order for cost optimization, the monitoring center may transmit a Short Message Service (SMS) call which triggers the firmware agent to initiate a host-originated call. Such an SMS call, or essentially similar type of call, may cause the firmware agent to wake up the host and allow the host agent to make a call.

The agent may be in a passive mode, an active mode or in alert mode. In the passive mode, the agent is present but does not do anything until activated by the user establishing a subscription for security monitoring or asset tracking. In the active mode, the agent calls out to the monitoring center at regular, predetermined or random intervals. In the alert mode, the host has been stolen and the agent has been given an instruction by the monitoring center to call in more frequently or carry out protective tasks such as data encryption.

C. Monitoring Center

In accordance with the present invention, the monitoring center is configured to communicate with the host device network interface, access of which is managed by the host agent in coordination with the secondary agent in the security module. Monitoring centers are sometimes also referred to using other terms, including a remote station, remote server, server, host monitoring system, host system, remote host system and monitoring server.

In accordance with an embodiment of the present invention, a typical monitoring centre may comprise call servers and software, web servers and web applications, database servers and databases, authentication systems, administrative systems and back end processing systems. A monitoring center can take calls from host agents over various bearer services such as IP or PSTN, and can identify computers, determine their licensing level and record their attributes and location, install and update software on monitored computers, and set up data-delete services and theft-recovery tools. A monitoring centre can provide a web interface for users to generate reports of their monitored assets and their locations.

Further, the monitoring center of the present theft recovery and asset tracking system comprises one or more new features. These include interfaces with gateways for SMS messaging for example, which allow the initiation of theft recovery operations earlier than if the monitoring center waited for the devices to be protected to call in according to their schedule. An additional benefit is that the monitoring center can potentially communicate with offline computers. A further additional benefit is that the monitoring center can potentially communicate with computers which are switched off but have with separately powered security modules, via a wake-up call.

The monitoring center may be a staffed monitoring service station. A plurality of monitoring systems may be distributed across the communication networks, for example in different geographic regions.

In relation to the security module in accordance with the present invention, a monitoring center server comprises a processor, a hard disk and hard disk controller, or other data storage means, and is configured to carry out one or more of the additional functions described below. A keyboard and screen may be operatively connected to the server to allow data input to and data readout from the server, and to permit an operator to interact with a monitoring server.

A first additional function of the monitoring center is to detect the presence of the security module during a host agent call and to configure it and the synchronization of the calling behaviour of the host agent and of the firmware agent.

A second additional function of the monitoring center is to collect and store the new attributes collected from clients with security modules. These new attributes include, for example, the equipment identifier for the security module.

A third additional function of the monitoring center is to activate a subscription for the security communications channel, if required, at appropriate times. This activation process requires interfaces with carrier systems. Alternatively, on notification from an owner of a tracked device that it has been stolen, staff at the monitoring center may contact, via phone, email, fax or other method, a telecommunications company to establish a subscription for the wireless module in the tracked device which has been stolen.

A fourth additional function of the monitoring center is to initiate calls to the tracked computers. This function is useful in particular when the tracked device has been notified as stolen. Instead of waiting for the tracked device to call in to the monitoring center at its next scheduled time via, the tracked device may be called immediately and the host agent put into alert mode. This technology may be implemented over SMS or another service with similar capabilities permitting real-time inbound communication to the monitored computer.

A fifth function of the monitoring center is to record additional location information, relating to the location of the tracked device or information that can be used to infer the location of the tracked device. This information may include coordinates collected from a GPS transceiver built-into the security module or a GPS unit separate from the security module; the IDs of the visible cell towers and their respective signal strengths; the MAC addresses and signal strengths of the visible WiFi routers. In the case where the location of the device is provided directly, e.g. in the case of GPS, the location is stored directly in the database. In the case where the location is inferred from collected attributes, e.g. the MAC addresses and signal strengths of the visible WiFi routers, the monitoring center inferfaces with a system to infer the location of the monitored computer.

Exemplary Embodiment

FIGS. 1-4 illustrate an example of the present invention applied to track an asset (i.e., a device to be protected) that is tracked by the user installing the agent on the asset, and the asset calling into the monitoring center.

Figure 1:
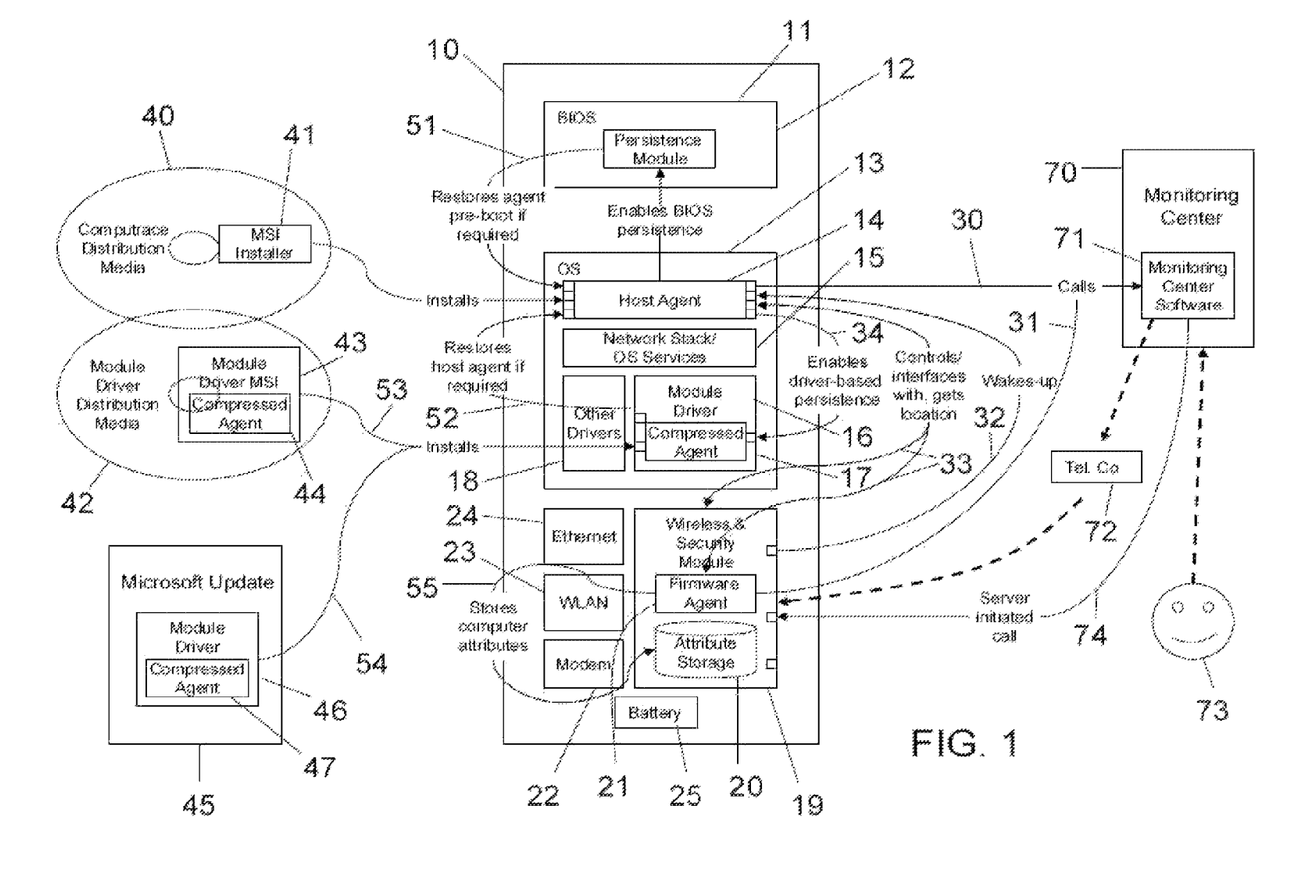
FIG. 1 is a schematic functional block diagram illustrating a protected device with security module and its interactions, in accordance with one embodiment of the present invention.

The device to be protected, or host, is a laptop computer 10. Some of the components and modules of the laptop are shown to help understanding of the invention, and others have been omitted for clarity. The host agent 14 is shown to reside in the OS 13, together with other features such as the network stack/OS services 15 and other drivers 18. The host agent has a persistence module 11 residing in the BIOS 12. This persistence module restores 51 the host agent pre-boot if required. The host agent 14 may be installed in the host via a computer readable distribution medium 40, on which is carried computer readable instructions 41 forming an MSI file installer together with the necessary code and files for installing the host agent. Other types of computer readable medium may be used. Also installed in within the OS is a module driver 16 for allowing the host agent to interact and control the cellular wireless security module 19. The module driver 16 may include a compressed agent 17 and may be configured to restore 52 the host agent if required, thus providing an extra level of self-repair of the agent. The host agent enables 34 driver-based persistence. The module driver 16 comprising the compressed agent 17 may be installed into the OS from a computer readable medium 42, which carries computer readable instructions 43 forming the module driver installer and the necessary driver code and files, and a compressed version of the host agent 44. The wireless module driver and compressed agent may also be installed via a Microsoft update 45 which includes the necessary driver code 46 and compressed agent 47. Alternatively, the host agent may also be directly installed during the operating system installation or by Windows Update. The laptop 10 also includes an Ethernet interface 24 a WLAN interface 23 and a Wi-Fi or other modem 22.

The cellular wireless security module 19 comprises a firmware agent 21 and non-volatile data storage device 20. While the firmware agent 21 and non-volatile data storage device 20 have been shown to be located in the wireless module 19, they may alternately be located elsewhere in the laptop, either together or separate from each other. The firmware agent causes computer attributes, such as details of installed software, to be electronically stored in the data storage device 20. An optional power supply 25 is operatively connected to the wireless security module to enable the firmware agent and wireless security module to operate when the host is switched off or is not connected to a power source.

The host agent 14 is configured to interface with and control the security module 19 and/or the firmware agent 21. The host agent 14 and firmware agent 21 are configured to retrieve location information if a location determination technology is included in the system. The firmware agent will only call if the host agent is not calling. For example, the firmware agent will call if the host agent does not "ping" the firmware agent in a configurable timeout period.

When a user or owner 73 of the laptop becomes aware that the laptop has been stolen, the user 73 contacts the monitoring center 71, via telephone, fax, email or any other available method. The fact that the laptop is stolen is recorded in a database in a server 71 in the monitoring center, either manually by a monitoring center member of staff or automatically if the notification is made via an internet connection or automated telephone answering system.

If it is not desired to wait for the next scheduled call from the host agent, the monitoring center may attempt to communicate with the host and/or firmware agent via the transmission of an SMS message. This message instructs the host agent and firmware agent to call. Since the host agent and firmware agent receive the message at nearly the same time, the firmware agent waits a configurable timeout to see of the host agent will call. If it does not call, the firmware agent will bring up a cellular data connection and call.

If there does not exist a cellular data subscription for the monitored computer, the a subscription may be set up by a monitoring staff member contacting a cellular network operator provider company 72 and proving them with the equipment identifier for the wireless module, or this may be done automatically via programmatic interfaces with one or more cellular network operators. A subscription is likely to be set up after a laptop has been stolen or a data delete request has been submitted.

Figure 2:
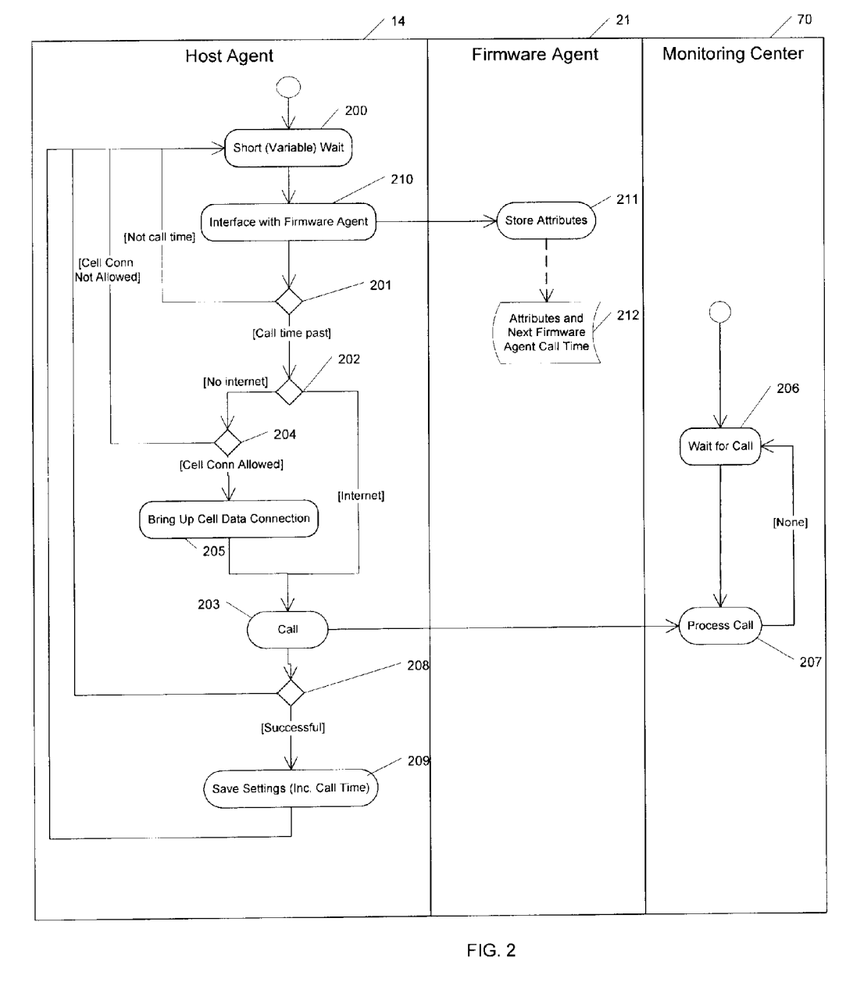
FIG. 2 is a functional flow diagram schematically representing the flow process during normal operation, in accordance with one embodiment of the present invention.

FIG. 2 is a flow diagram schematically representing the usual process with which the host agent 14 and firmware agent 21 operate, together with their interaction with the monitoring center 70. Once the host agent is running, after checking that it is complete, it enters a short period of waiting 200, which can be set to any predetermined value. For illustrative example only, the value could be set to 15 minutes. After this wait period, it interfaces 210 with the firmware agent, which stores 211 the attributes and next firmware agent call time 212 in the non-volatile memory to which it has access. The next firmware agent call time is typically set to some value in the future beyond the next time the agent will interface with the firmware agent. But, if the agent has not successfully called the monitoring center in an extended period, it may indicate to the firmware agent that it should attempt to call immediately. The stored attributes may include attributes of the OS and details of the programs installed on the computer The agent subsequently checks to to see if it is time to call the monitoring centre. The time to call the monitoring center could be set to be every 24 hours, for example. If it not yet time to call, the host agent returns to the wait mode 200. If it is past the time to call the host agent checks whether an internet connection is available, and if so, makes a call 203 to the monitoring center via the internet. Prior to the call, the monitoring center is in a state of wait 206, in which it is waiting for an incoming call to be made. On receipt of a call 203, the monitoring center processes 207 the call, after which it returns to a state of waiting for a subsequent call. If there is no internet connection available, the host agent checks whether a cellular connection is allowed 204, and if so, it brings up a cellular data connection 205 which it uses to call 203 the monitoring center.

If the call is not successful 208, the host agent goes back to the state of a short wait 200, and repeats the process described. If the call is successful, the host agent saves 209 the time for its next call.

During a successful call the monitoring center may record the location and identity of the computer calling in, and provide further instructions to the host agent. Further instructions to the host agent may be to initiate a data delete process, a program update or an encryption key change, and may include instructions to be executed after termination of the call.

If there is a both user cellular channel and a dedicated wireless security channel, the host agent may be configured to call on the user channel before attempting to connect on the dedicated security channel. The host agent may instead be configured to call on the security channel before attempting to connect on the user channel. Alternately, the choice of channel may be controlled by a cost minimizing algorithm.

Figure 3:
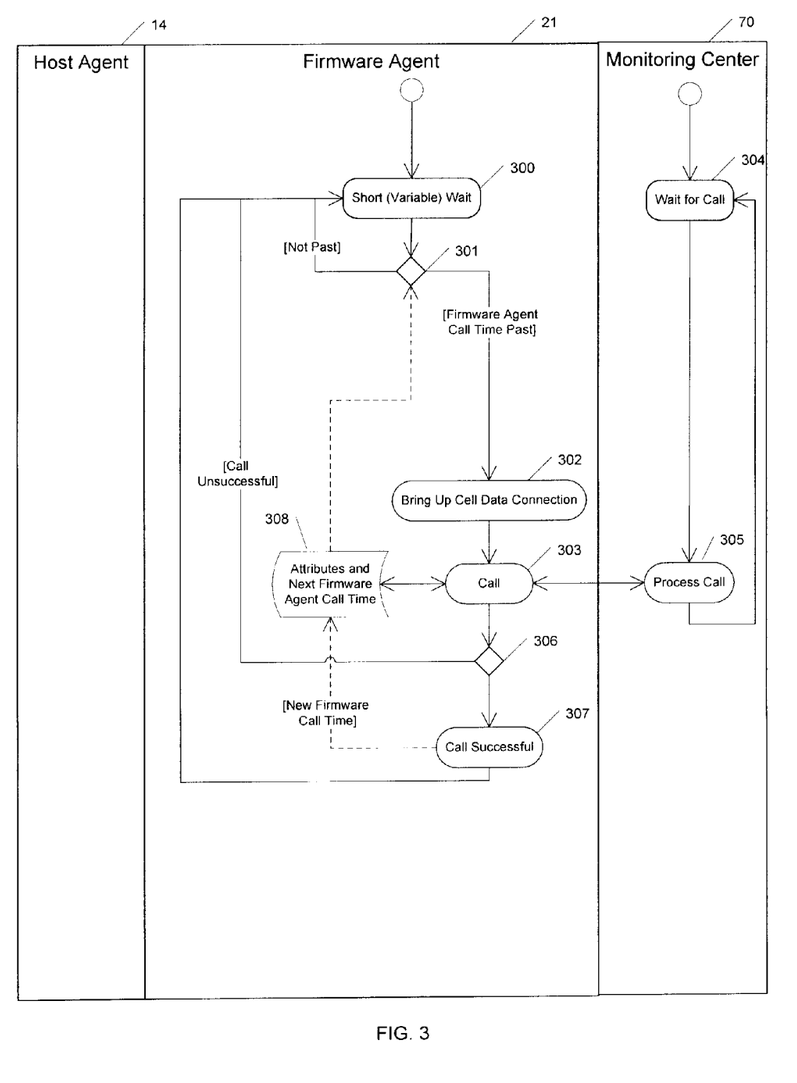
FIG. 3 is a functional flow diagram schematically representing the flow process when the host agent is inactive, in accordance with one embodiment of the present invention.

FIG. 3 is a flow diagram schematically representing the process of the firmware agent 21 in the case where the host agent 14 is inactive. This could be because the computer is switched off, there is no internet connection or because the host agent has been somehow disabled. In the case that the computer is switched off, the security module must be self-powered.

In the case of an inactive host agent, the firmware agent is in a short period of waiting 300. After this period of waiting, the firmware agent checks 301 whether it is past the time to call the monitoring center 70. If it is not past this time, the firmware agent returns to the wait state 300. If it is past the time to call, the firmware agent brings up a cellular data connection 302, which it uses to call 303 the monitoring center. Prior to the call, the monitoring center is in a state of wait 304, in which it is waiting for an incoming call to be made. On receipt of a call 303, the monitoring center processes 305 the call, after which it returns to a state of waiting for a subsequent call.

If the call is not successful 306, the firmware agent goes back to the state of a short wait 300, and repeats the process described. If the call is successful 307, the firmware agent stores the attributes and next call time 308 in the non-volatile memory to which it has access. The stored attributes may include attributes of the OS and details of the programs installed on the computer.

Figure 4:
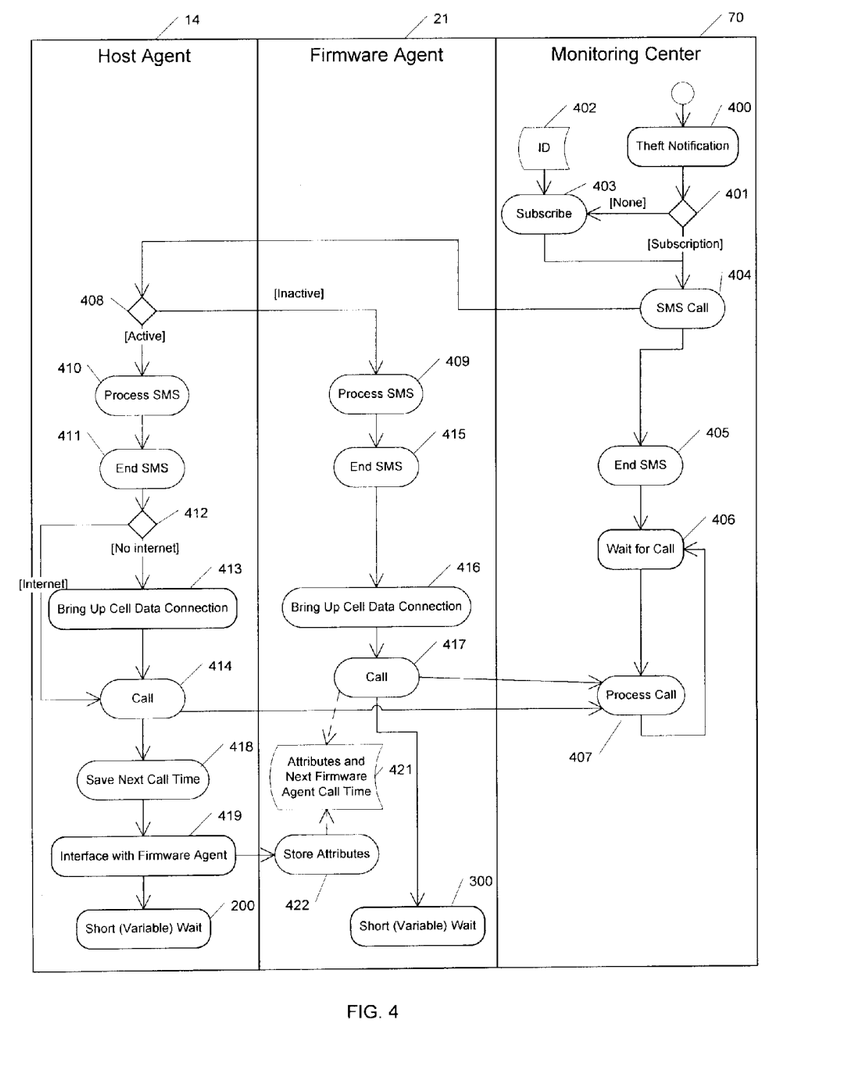
FIG. 4 is a functional flow diagram schematically representing the flow process for monitoring center initiated calls, in accordance with one embodiment of the present invention.

FIG. 4 is a flow diagram schematically representing the host agent 14 and the firmware agent 21 are in a period of waiting because it is not the scheduled time for calling, but it is desired to make a call to the computer. For example, this could be in the case that the computer has been stolen. Initially the host agent, the firmware agent and the monitoring center 70 are in a state of waiting. If the monitoring center is informed that the computer has been stolen 400, it will check 401 whether there is a wireless data subscription, and if so, makes a call 404 to the host and/or firmware agents. If there is no subscription of the computer to a wireless communications provider it will establish a subscription 403 using stored or otherwise provided ID information 402 relating to the unique equipment identifier of the wireless module within the computer, and then make a wireless call 404. To establish a subscription, the monitoring center may contact a telecommunications provider company either automatically or manually.

The wireless call 404 made by the monitoring center may be an SMS call. If the host agent is inactive 408, for example if the computer has been turned off, or if the host agent is damaged, the firmware agent accepts the call and processes the SMS message 409. However, if the host agent is active, it processes the SMS call 410 itself.

In the case where the host agent is active the SMS call 410 instructs the host agent to call back the monitoring center. The SMS call ends 411, 405, the monitoring center enters a state of waiting 406 for an incoming call from the protected device and the host agent checks 412 whether there is an internet connection. If so, it makes an internet based call 414 to the monitoring center, but if not it brings up a cellular connection 413 on which it calls 414 the monitoring center. The monitoring center processes the call 407 and then returns to a state of wait 406. Following a successful call, the host agent stores the next time at which it needs to call the monitoring center, which in the case of a stolen computer may be considerably sooner than when not stolen. For example only, the next call time could be set to be in 15 minutes' time. The host agent interfaces 419 with the firmware agent, which stores 422 the attributes and next firmware agent call time 421 in the non-volatile memory to which it has access. An example call time would be in 25 minutes' time. After this the host agent enters a state of waiting 200, after which it follows the procedure as shown in FIG. 2.

In the case where the host agent is inactive, the firmware agent interprets the SMS call 409 as an instruction to call back the monitoring center. The SMS call ends 415 and then the firmware agent brings up a cellular data connection 416, on which it calls 417 the monitoring center. The monitoring center processes the call 407 and then returns to a state of wait 406. The call may involve, for example, an instruction to the firmware agent to switch on the computer and/or wake up the host agent.

Following or during a successful call, the firmware agent stores the attributes and next firmware agent call time 421 in the non-volatile memory to which it has access. The firmware agent then proceeds to a state of waiting 300, and continues the process described in FIG. 3.

Alternative Embodiments

An alternate embodiment envisioned is the full integration of the wireless security module into the motherboard of the host system. This would effectively eliminate the possibility of disabling the security module via physically removing the module.

The disclosed technology is not limited to cellular wireless communications but may employ other wireless or mobile technologies, including personal area network (PAN), wireless local area network (WLAN) and satellite-based technologies.

In another embodiment the wireless module may be capable of both Wi-Fi and/or WIMAX and/or cellular wireless communications.

The security module may be implemented using virtualization techniques where the firmware agent runs in a virtual environment on the computer's main processor and shares the system's network interfaces in a manner completely unbeknownst to the computer's main OS.

The wireless security module may be powered by an independent power supply. This may be in the form of a dedicated battery or simply independent connections to the laptop's main power supplies. The advantage of such a configuration is that the firmware agent can communicate even when the host computer system is off.

In the case of a independently-powered module, the wireless security module may be able to wake-up the host system. If this is the case, the monitoring center can communicate with the firmware agent and wake-up the host computer to execute, for example, a data protection operation.

System administrators are also able to determine the physical location of tracked systems. They may also enforce geographic-based policies, e.g. computer X cannot be moved outside of a defined geographic boundary. The agent may call in to a monitoring center every time a change in location of the laptop is detected as well as calling in according to a predetermined schedule. Alternately, it may call in every time it detects that it is in a new location rather than a changed location. Location information may be provided by cellular triangulation, WiFi signal strength triangulation, RFID tagging techniques, IP look-up or GPS devices.

The embodiments described above provide security modules that can be effectively integrated into a host device, which coordinates with the host agent to communicate with an external site. The security module embodiments described above can be extended for protection of various types of devices, systems, and subsystems, not limited to the structural and process embodiments described above, without departing from the scope and spirit of the present invention. Hence the security module of the present invention should not be bound by the specific implementing algorithms.

The process and system of the present invention has been described above in terms of functional modules in block diagram format and flow processes. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the information extraction application can be easily modified to accommodate different or additional processes to provide the user additional flexibility for web browsing. Accordingly, it is to be understood that the invention is not to be limited by the specific illustrated embodiments, but only by the scope of the appended claims.

The invention claimed is:

1. A system for remotely monitoring a device, comprising:
at least one network;
at least one network interface in the device associated with said at least one network;
wherein the device comprises hardware;
a host agent running on a host operating system provided in the device, said host agent accessing said at least one network via said at least one network interface;
a monitoring center connected to said at least one network, configured to communicate with at least one of the host agent and secondary agent via said at least one network interface; and
a secondary agent provided in the device, wherein the secondary agent accesses said at least one network via said at least one network interface independently of the host operating system, wherein the secondary agent and the host agent interface to coordinate which is to access said at least one network via said at least one network interface to communicate attributes of one or more of the device and host operating system to the monitoring center, and wherein said coordination results in communications to the monitoring center being made by the host agent in preference to the secondary agent.

2. The system of claim 1, wherein said at least one network comprises first and second networks, wherein said at least one network interface comprises a host network interface that is accessible by both the host agent and the secondary agent to access said first network, and a secondary network interface to which the secondary agent has dedicated access to communicate with the monitoring center via the second network.

3. The system of claim 2, wherein the secondary agent and the monitoring center communicate via the secondary network interface if the host network interface becomes unavailable.

4. The system of claim 1, wherein the host agent runs on a processor in the device, and the secondary agent runs in a virtual environment on the same processor.

5. The system of claim 1, wherein the host agent runs on a processor in the device, and secondary agent is independently powered so that it can function independently of the processor.

6. The system of claim 5, wherein the secondary agent is configured to resume operations of the host operating system from a disabled state.

7. The system of claim 6, wherein the secondary agent contacts the monitoring center and receives instruction from the monitoring center to resume operations of the host operating system, and to request the host agent to contact the monitoring center.

8. The system of claim 1, wherein the host agent and the secondary agent coordinate access to said at least one network in a manner to minimize network charges.

9. The system of claim 1, wherein the secondary agent accesses said at least one network via said at least one network interface if the host agent is not functional to access said at least one network.

10. The system as in claim 1, wherein the device is configured to reinstall the host agent when the host operating system detects the presence of the secondary agent.

11. The system as in claim 10, wherein the host agent provides one or more device tracking and management services, and wherein licenses associated with the services are stored in a persistent storage location in the device.

12. The system as in claim 1, wherein said at least one network comprises a cellular network.

13. The system as in claim 12, wherein the monitoring center requests the host agent or the secondary agent to contact the monitoring center by transmitting an SMS message to the cellular network.

14. The system as in claim 12, wherein the host agent or the secondary agent contacts the monitoring center via the cellular network by sending an SMS via a cellular modem associated with a number, and wherein the monitoring center can determine the number from source information contained in the SMS message.

15. The system as in claim 1, wherein a subscription to said at least one network is provisioned to enable communications on said at least one network in response to a predetermined event requiring communication between the device and the monitoring center.

16. The system as in claim 1, wherein said at least one network interface comprises at least two network interfaces, of which one is used exclusively for communicating with the monitoring center.

17. The system as in claim 1, wherein said at least one network interface comprises multiple network interfaces, and wherein the host agent and secondary agent minimize network charges by selecting use of lower cost networks.

18. The system of claim 1, wherein said coordination results in the secondary agent communicating with the monitoring center if the secondary agent is not pinged by the host agent during a predetermined period of time.

19. A system for remotely monitoring a device, comprising:
at least one network;
at least one network interface in the device associated with said at least one network;
wherein the device comprises hardware;
a host agent running on a host operating system provided in the device, said host agent accessing said at least one network via said at least one network interface;
a monitoring center connected to said at least one network, configured to communicate with at least one of the host agent and secondary agent via said at least one network interface; and
a secondary agent provided in the device, wherein the secondary agent accesses said at least one network via said at least one network interface independently of the host operating system, and wherein the secondary agent and the host agent coordinate as to which is to access said at least one network via said at least one network interface to communicate attributes of one or more of the device and host operating system to the monitoring center, wherein upon installation of the operating system, the host agent and secondary agent are automatically installed, and wherein in the absence from the device of a license for a service provided by the host agent, the host agent and secondary agent uninstall themselves.

20. A system for remotely monitoring a device, comprising:
at least one network, wherein said at least one network comprises a cellular network;
at least one network interface in the device associated with said at least one network;
wherein the device comprises hardware;
an agent in the device, said agent accessing said at least one network via said at least one network interface; and
a monitoring center connected to said at least one network, configured to communicate with the agent via said at least one network interface, wherein the device does not maintain a subscription to the cellular network, wherein the monitoring center is configured to initiate provisioning of a subscription of the device to the cellular network without request by the device in the event provisioning is needed before use of the cellular network is permitted, wherein the subscription to said cellular network is provisioned to enable communications on said cellular network in response to a predetermined event requiring communication between the monitoring center and the device, and wherein the agent communicates attributes of one or more of the device and host operating system to the monitoring center via the cellular network.

21. A method of tracking a device, comprising:
providing at least one network interface in the device associated with at least one network;
providing a host agent running on a host operating system in the device, said host agent accessing said at least one network via said at least one network interface;
connecting a monitoring center to said at least one network, configured to communicate with at least one of the host agent and secondary agent via said at least one network interface;
providing a secondary agent in the device wherein said secondary agent accesses said at least one network via said at least one network interface independently of the host operating system; and
interfacing to coordinate between the secondary agent and the host agent to determine which is to access said at least one network via said at least one network interface to communicate attributes of one or more of the device and host operating system to the monitoring center, wherein said coordinating results in communications to the monitoring center being made by the host agent in preference to the secondary agent.

* * * * *